Figure 1:
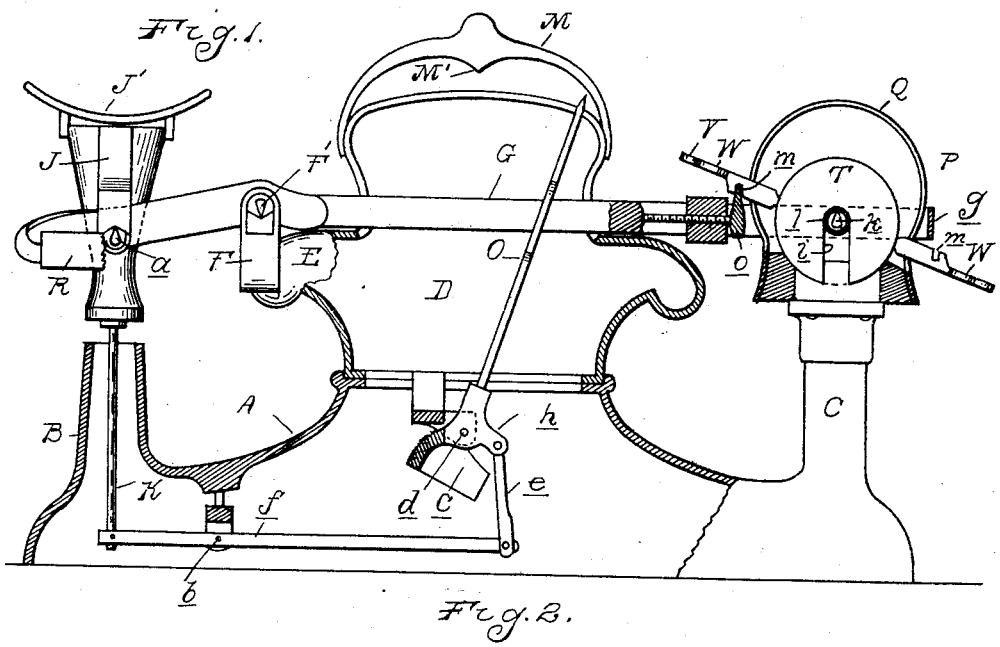

No. 766,777. PATENTED AUG. 2, 1904.
W. F. STIMPSON.
SCALE.
APPLICATION FILED JUNE 24, 1901.
NO MODEL. 2 SHEETS—SHEET 1.

Witnesses
Inventor
Walter F. Stimpson

No. 766,777. PATENTED AUG. 2, 1904.
W. F. STIMPSON.
SCALE.
APPLICATION FILED JUNE 24, 1901.
NO MODEL. 2 SHEETS—SHEET 2.
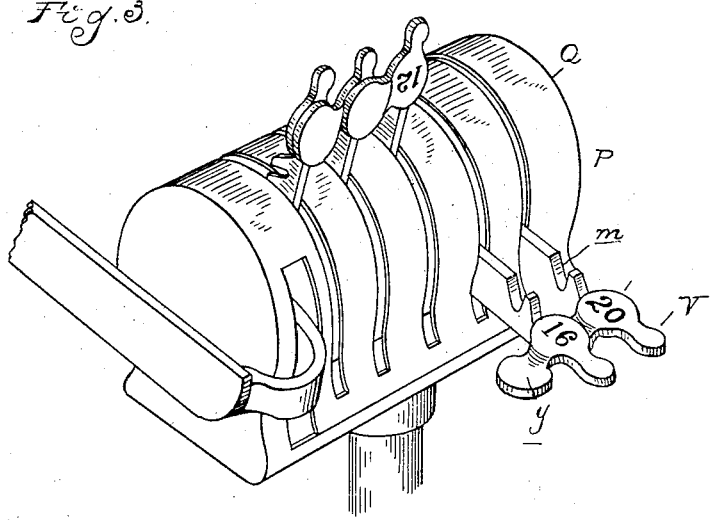
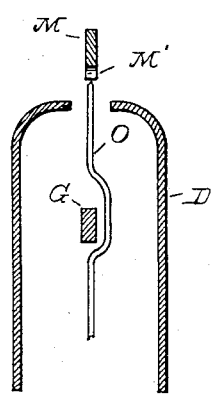
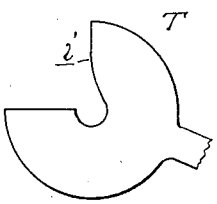
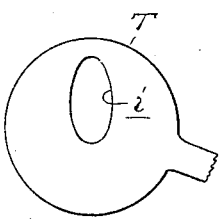
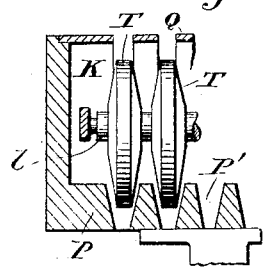
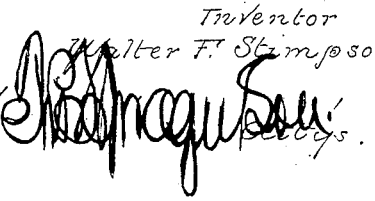

No. 766,777. Patented August 2, 1904.

UNITED STATES PATENT OFFICE.

WALTER F. STIMPSON, OF DETROIT, MICHIGAN.

SCALE.

SPECIFICATION forming part of Letters Patent No. 766,777, dated August 2, 1904.

Application filed June 24, 1901. Serial No. 65,787. (No model.)

*To all whom it may concern:*

Be it known that I, WALTER F. STIMPSON, a citizen of the United States, residing at Detroit, in the county of Wayne and State of Michigan, have invented certain new and useful Improvements in Scales, of which the following is a specification, reference being had therein to the accompanying drawings.

The invention consists in an improvement in scales, and relates to that class of scales in which the weights are supported in proximity to the weighing-beam and are adapted to be mechanically applied to the latter without handling the weights, so that the scale may be quickly set to weigh any desired quantity within its capacity.

The invention consists in the novel construction of the scale, the weights, means for applying the weights to the scale and moving them therefrom, and the construction of a balanced indicator.

The invention further consists in the construction, arrangement, and combination of the various parts, as more fully hereinafter described, and set forth in the drawings.

Figure 2:
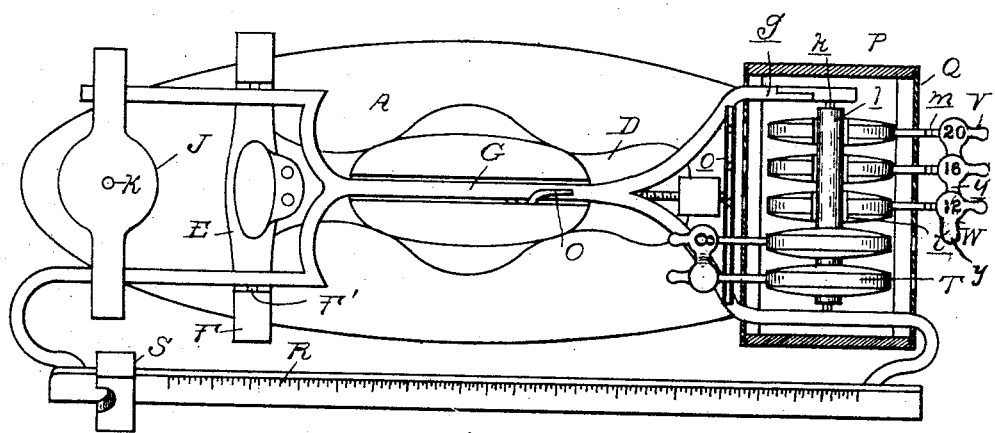
Figure 4:
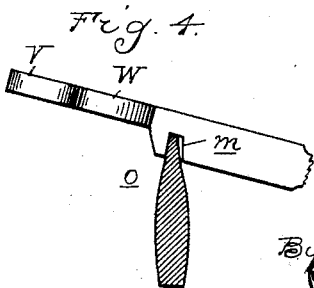

In the said drawings, Figure 1 is a vertical central section through the scale, partly in elevation. Fig. 2 is a plan view thereof with segment M removed. Fig. 3 is a perspective view of the weight rack and arms. Fig. 4 is a detail elevation of one of the actuating-arms for the weights and the locking means for positively locking the center of gravity of the weight in relation to the pivots of the beam. Fig. 5 is a central cross-section through the upper part of the frame and scale, showing the construction and arrangement of the indicator or balance-pointer. Figs. 6 and 7 are elevations of different forms of weights which may be used in carrying out my invention. Fig. 8 is a vertical cross-section through a portion of Fig. 3.

A represents the scale-base, which, as shown, is simply a hollow casting having the standards B and C rising from each end thereof and preferably a central hollow standard D. The standard D, as shown in Fig. 2, is preferably slotted at the top and is provided with the lateral extension E, which supports the fulcrum-bearing F, upon which the pivots F' in the weighing-beam G are fulcrumed. As shown in the drawings, this weighing-beam G extends through the slot in the central standard D and its ends are bifurcated, as plainly shown in Fig. 2, the fulcrum-pivots F' being secured to the furcations at one end. The weighing-beam in this case I have shown as a multiplying-lever, and upon the end of the short arm are pivots $a$, upon which is pivoted the head-block J. This head-block may have a suitable scoop-support, like J', as shown, or it may have a flat plate or any other suitable means of supporting the goods to be weighed.

K is the usual steady-rod, formed either as a rod attached to or a lower extension of the head-block J and passing through the standard B, its lower end being connected to a link $f$, pivoted at $b$ to the base and at its opposite end to a link $e$, which in turn is pivoted to an arm $h$ upon one side of the pointer O. This pointer O is pivoted at $d$ to the base of the scale and is provided with a counterweight $c$ so constructed as to counterbalance the pointer O at all points in its movement. This pointer therefore is a counterbalanced or poised pointer which is used for the purpose only of indicating if the scale is in balance or not. It will be seen that the pointer is actuated through a multiplying-lever connection, the lever $f$ and the arm $h$ of the pointer forming lever connections, so that with a very small movement of the head-block or the goods-support the pointer will have a wide range of travel. For instance, in the scale from which this drawing was made the goods-support has an up-and-down movement of not to exceed five-sixteenths of an inch, while the balanced pointer has a travel at its upper end of four inches. Thus the slightest overweight on the scale will be indicated by a marked movement of the pointer, enabling the dealer to balance his goods and weigh them very much more closely than with other constructions. It is well known, for instance, that grocers and others usually put the paper in which the article is wrapped on the scale, and his paper costs but a few cents a pound, and as the usual commodities are more expensive than paper it is advantageous for the grocer to weigh the paper into the weight of the commodity which he is selling. The ordinary scale without such an indicator as O does not give a sufficiently wide range of movement for slight weights on the platform or goods-support to indicate to the salesman the weight of the sheet of paper upon the scale; but with this device, in which the movement of the counterbalance-pointer is very greatly multiplied, the weight of the sheet of paper will be indicated on the scale, so that the grocer may by care in weighing get his returns for the paper as well as the product.

The pointer O is suitably curved, as shown in Fig. 5, to pass around the weighing-beam and projects through the slot in the top of the central post D, there being a segment M above the pointer with a central indicating-point M', by which the balance of the scale may be readily determined.

Upon the top of the post C is a head which supports the weights T and which therefore I will refer to as the "weight-rack" P. This rack has a number of grooves or recesses P' in its upper face, in which a corresponding series of circular weights T are supported free to rotate. These weights are cut away or slotted, as shown at $i$ in Fig. 1 or as shown in Figs. 6 and 7.

The weighing-beam above or beside the weights is provided with a rigid cross-bar upon which the weights are adapted to be moved. This cross-bar I preferably form by means of the inwardly-extending pivots $k$ near the ends of the furcations $g$ of the weighing-lever, and upon these pivots I place a tubular roller or sleeve $l$. This cross-bar, whether formed in this manner or in any other manner, is arranged so as to move up and down with the movement of the weighing-beam in the slot or cut-away portions of the weights and free therefrom.

If it is desired to apply a weight to the cross-bar, the operator grasps an arm or finger V, attached to or formed with the weight, and by turning the weight upon its axis it will be saddled upon the cross-bar of the weighing-lever, as plainly shown in Fig. 1 and in the lower portion of Fig. 2.

In order to perfectly locate the center of gravity of the weights in relation to the pivots of the scale, I lock or fix those weights when they are moved upon the weighing-lever by some suitable means at the point at which the weights are saddled upon the weighing-beam. This I accomplish in the construction shown by forming a notch $m$ in each of the arms and arrange a notched tapering cross-bar $o$ on the weighing-beam, with which the notched arm is adapted to engage, so as to prevent lateral movement of the arm upon the cross-bar.

While I prefer to use the construction of cross-bar shown, in which there is a hollow roller $l$ supported upon transverse pivots, as it enables me to more accurately center the weights upon the scale in relation to the other pivots, this is not essential where I employ other centering means, such as the notch in the arms and the notched cross-bar last described, for this construction accurately locates the center of gravity of the weights in relation to the pivots of the scale.

I may and preferably do provide a slotted cover Q for the weight-rack, as shown.

The construction shown in the drawings comprises a series of weights of the same size and value, there being five such weights of a capacity of four pounds, the capacity of the indicating-beam R, with its poise S, in this case being also four pounds. Each of the arms V has a tablet W on its end, upon which is marked the weight. Upon the tablet of the first weight is marked the figure "4," being the weight value of that weight. Upon the second is marked the figure "8," being the value of the first and second weights. Upon the third tablet is marked the figure "12," upon the fourth the figure "16," and upon the fifth the figure "20," these marks being applied upon both sides of the tablets. Means are provided compelling the operation of the weights of lower denomination with any weight of higher denomination, so that the indication will always be correct. The means which I have shown for effecting this result consists of the lugs $y$ upon the sides of the levers V, which project from such lever of higher denomination beneath the lever of the next lower denomination. Thus in order to weigh eight pounds the operator will take hold of the second lever (marked "8") and by turning it upon its axis from its position at the right hand of the weight-rack to its position on the left hand thereof he would carry with that arm the arm marked "4," which would thus apply upon the scale-beam two four-pound weights, which would be indicated as "8" by the exposed marking upon the second arm. If the "12" arm were operated, the other two arms would be carried with it and the "12" alone would be indicated, as shown in Fig. 3, in which three of the arms are indicated partially operated. The indications upon the tablets of the "8" and the "4" arms will be covered up by the lugs $y$, so that the only indication will always be the total of the operated weights, the other figures being covered up, so that no confusion is possible.

With this construction it is obvious that in actuating the weights to their "on" position if all five weights are to be operated—that is, twenty pounds weighed—the operator takes hold of the single arm (marked "20") and by its actuation carries with it all the other arms and their weights, and thereby applies them to the scale. In order to remove the weights thus applied, the operator takes hold of the arm marked "4" and by means of the interlocking lugs or couplers all the weights may be turned off of the weighing-beam. It is also obvious from the construction shown that this coupling arrangement for the weights does not interfere with the separate actuation of the weights in case they are desired to be separately applied, and I therefore have a device in which the weights may be separately applied or in which they may be coupled and all or part applied by a single actuating device.

What I claim as my invention is—

1. In a scale, the combination of the weighing-beam, a weight-rack, a series of rotatable weights supported on the rack, a support on the beam for said weights, arms on the weights by which the weights may be rocked from the weight-rack to rest upon the beam, and overlapping lugs on the arms forming couplers between adjoining weights for the purpose described.

2. In a scale, a series of weights, a weight-rack, a weighing-beam, a series of arms one for each weight, a lug on each arm above the first one engaging beneath the arm on the weight of next lower denomination whereby the movement of an arm of higher denomination carries with it the weights of lower denomination, and means for exposing the total weight only of the applied weights.

3. In a scale, a weighing-beam, a series of weights, a separate actuating device for each weight for applying it to or removing it from the weighing-beam and an indicating device for indicating only the total of a multiple of actuated weights.

4. In a scale, a weighing-beam pivoted intermediate its ends, a head-block pivotally supported thereon at one end, a transverse pivot at the other end of sufficient length to support all the weights, a weight-rack for supporting the weights adjacent to said pivot and a series of movable weights on the rack, and means for moving the weights from the rack and inverting said weights whereby they may rest directly upon the pivot.

5. In a scale the combination of a weighing-lever, and transverse pivot thereon, a series of weights, and means for inverting the said weights to cause them to rest upon or be removed from said pivot.

6. In a scale, the combination of a weighing-beam, a multiple of weights adapted to be connected to said beam, an actuating device on each weight for connecting it with the beam, and means for coupling said weights whereby consecutive weights may be applied simultaneously by actuating a single weight-applying device.

7. In a scale, the combination of a weighing-beam, a multiple of weights, means by which each weight may be separately applied to the beam, and means for connecting consecutive weights to move together by the operation of one of the separate weight-applying devices.

8. In a scale, the combination of a vertically-movable weighing-beam, of a multiple of weights adapted to be applied to the beam at any point in its vertical movement, and instrumentalities whereby any desired number of consecutive weights may be applied upon the operation of one of said weights.

9. In a scale, the combination of a base, the weighing-lever, a head-block pivoted on one end thereof, a steady-rod depending therefrom, a link pivoted to the steady-rod and to the base, a bell-crank lever pivoted to the base, one arm of which constitutes a pointer, and a connection between the link and the other arm of said bell-crank lever.

10. In a scale, a base, a weighing-lever pivoted intermediate its ends on the base, a head-block pivoted on one end thereof, a link pivoted to a downward extension from the head-block and to the base, a bell-crank lever pivoted to the base one arm of which extends upwardly and constitutes a pointer, and a connection between the opposite arm of said bell-crank lever and the link.

11. In a scale, a hollow base, a weighing-lever pivoted intermediate its ends on the base, a goods-supporting head-block pivoted on one end thereof, a lever located below the weighing-lever pivoted within the hollow base and to a downward extension of said block, a counterweighted bell-crank lever one arm of which constitutes a pointer pivoted within the base and extending therethrough near the middle, and a connection from the first-mentioned lever to the other arm of the bell-crank lever.

12. In a scale, the combination of the weighing-beam, of a transverse pivot thereon, a series of slotted weights adjacent to said pivot, means for rocking said weights to engage the slot therein with and thereby to support them on the pivot, and a sleeve carried by said pivot upon which the weights are applied.

13. In a scale, a weighing-beam, a transverse bar at one end thereof, a series of weights having bearing portions adapted to straddle said bar and be supported thereby, in combination with means for locating and holding the weights in fixed relation, and means for inverting the weights to cause them to rest upon or be removed from said bar.

14. In a weighing-scale, the combination with the weighing-beam, of a series of weights adapted to be applied separately to the beam, a stationary weight-support beside the beam on which the weights are normally supported, and means carried by the weights for applying a multiple of the latter simultaneously to the beam.

15. In a weighing-scale, the combination with the weighing-beam, of a series of weights normally disconnected from the beam and capable of being applied separately thereto, means carried by the weights for shifting a multiple of the latter upon the beam simultaneously, by the manipulation of one weight.

16. In a weighing-scale, the combination with the weighing-beam, of a series of detachable weights adapted to be applied separately to the beam, and means carried by the weights for applying the series to the beam simultaneously.

17. In a weighing-scale, the combination with the weighing-beam, of a series of detachable weights adapted to be applied separately to the beam, and a single actuating device for simultaneously shifting a multiple of weights in the series upon said beam.

18. In a weighing-scale, the combination with the weighing-beam, of a series of weights normally disconnected from the beam and adapted to be applied separately thereto, a series of arms carried by the weights, and connections between said arms, whereby upon the actuation of one weight at one end of the series the series can be operated.

19. In a weighing-scale, the combination of a weight-rack, a series of slotted weights thereon, a transverse bar or pivot on the beam moving in the slot of the weights, and means for rotatably reversing said weights about the bar or pivot to rest thereon or be removed to the weight-rack.

20. In a weighing-scale, the combination with the weighing-beam having a forked end, of knife-edge bearings upon the end portions of the fork members, a tube extending between said members and mounted upon the bearings, a series of rotatable slotted weights supported beneath said tube, the weights being normally out of contact with and embracing the tube, and operating-levers connected to the weights for rotating the latter, substantially as described.

In testimony whereof I affix my signature in presence of two witnesses.

WALTER F. STIMPSON.

Witnesses:
M. B. O'DOGHERTY,
H. C. SMITH.